United States Patent [19]

Simpson

[11] 4,312,900
[45] Jan. 26, 1982

[54] METHOD OF TREATING SLIDING METAL CONTACT SURFACES

[75] Inventor: Leslie G. Simpson, Romford, England

[73] Assignee: Ford Motor Company, Dearborn, Mich.

[21] Appl. No.: 157,618

[22] Filed: Jun. 9, 1980

[51] Int. Cl.³ .............................................. B05D 7/22
[52] U.S. Cl. .................................. 427/181; 308/239; 308/241; 427/198; 427/199; 427/289; 427/292; 427/348
[58] Field of Search ............... 427/289, 292, 181, 183, 427/197, 198, 199, 239, 276, 348; 29/149.5 PM; 308/239, 241

[56] References Cited

U.S. PATENT DOCUMENTS

| | | | |
|---|---|---|---|
| 2,343,569 | 3/1944 | Neely et al. | 148/6.14 R |
| 2,622,993 | 12/1952 | McCullough et al. | 427/5 |
| 2,691,814 | 10/1954 | Tait | 428/545 |
| 2,807,511 | 9/1957 | Fleming | 277/216 |
| 2,813,041 | 11/1957 | Mitchell et al. | 308/241 X |
| 3,054,649 | 9/1952 | Arnold et al. | 308/241 |
| 3,063,763 | 11/1962 | Zubrisky | 308/241 |
| 3,073,761 | 1/1963 | Covino | 204/38 E |
| 3,075,279 | 1/1963 | Haltner et al. | 29/149.5 R |
| 3,341,348 | 9/1967 | Letendre | 428/173 |
| 3,500,525 | 3/1970 | Glenn | 29/148.4 |
| 3,545,831 | 12/1970 | Köpke et al. | 308/239 |
| 3,784,264 | 1/1974 | Jackson, Jr. | 308/8.2 |
| 4,051,275 | 9/1977 | Forestek | 427/180 X |

*Primary Examiner*—Evan K. Lawrence
*Attorney, Agent, or Firm*—Joseph W. Malleck; Olin B. Johnson

[57] ABSTRACT

A method of treating metal sliding contact surfaces is disclosed. The method comprises pitting the surface (as by shot-blasting with glass or sand), impregnating the pitted surface with a dry lubricant (such as powdered graphite or $MoS_2$), and roughening the impregnated surface to partially close the pits and to generate "peaks" of metal which are worn away during a bedding-in of the interengaging sliding contact surfaces.

2 Claims, No Drawings

METHOD OF TREATING SLIDING METAL CONTACT SURFACES

BACKGROUND OF THE INVENTION

Sliding metal contact surfaces, and in particular cylinder liners of internal combustion engines, present a difficult problem of lubrication. Lubricating oil presented to a hard smooth cylinder liner surface is eventually scraped off such surface by tightly interengaging piston rings, thus preventing wetting and retention of an oil film. However, modifications to allow buildup of an oil film can lead to undue oil comsumption by exposure to the combustion process. The prior art has attempted to controllably retain the lubrication oil in pores created in the bearing surface by grit blasting but, due to the viscosity of the oil, the reserve of oil in the pores is diminished by dragout.

Thus, the art has turned to lubricants, other than oil, to promote improved friction-free contact. Such lubricants have included graphite, $MoS_2$, and organic resins. U.S. Pat. Nos. 3,075,279; 2,691,814; 3,073,761; 3,500,525; and 2,622,993 illustrate attempts to bond these lubricants to the bearing surface by using pressure to achieve adherence on an unpitted surface. However, the adherency has not always been successful and such treatment is not suitable to internal combustion engines where close tolerances would be affected by such coatings.

Better adherency has been sought by the prior art by way of selecting lubricants that can be heat fused to the bearing surface which in some cases has been pitted by grit blasting or etching (see U.S. Pat. Nos. 3,341,348; 3,054,649; and 2,807,511). However, these coatings by necessity are thick and require the additional expense of stripping to expose the bearing surface.

What is needed is a treatment for sliding metal contact surfaces which provides a ready supply of lubricating material at the surfaces without the necessity of bonding the material. Such supply should be self-regulating and not require stripping to obtain some metal bearing. Furthermore, such material should be compatible with oil lubrication while preventing an undue buildup of a lubricating film.

SUMMARY OF THE INVENTION

The method herein for treating sliding metal contact surfaces comprises pitting one or more of the contacting surfaces, impregnating the pitted surface with a dry powdered lubricant, and roughening the impregnated surface.

Preferably, the contact surface is pitted by shot-blasting using abrasive materials such as glass or sand. Impregnation is preferably carried out by buffing dry $MoS_2$ into the pits of the contact surface. Roughening is preferably carried out to partially cover the impregnated pits; this is preferably effected by additional shot blasting which creates peaks of metal on the treated surface and moves some of the surface metal to overhang the pits.

DETAILED SPECIFICATION

The method of this invention is particularly suitable for the treatment of cylinder liners for internal combustion engines. The method may, however, be used on other metal sliding contact surface, for example, bearing surfaces, especially thrust bearings in cam shafts and crank shafts, and contact surfaces in gear teeth and journals.

The method comprises pitting at least one of the contact surfaces, impregnating the pitted surface with a dry lubricant, and roughening the impregnated surface. Pitting is preferably carried out by shot-blasting using abrasive particles in a fine particle size range of 250–400 microns. The abrasive particles can be glass or sand.

Impregnation of the pitted surface is preferably effected by buffing a dry solid lubricant into the pitted surface. The dry solid lubricant is preferably selected from the group consisting of $MoS_2$ and graphite; best results have been obtained with $MoS_2$.

Roughening of the impregnated surface is critical and is preferably carried out by shot-blasting with abrasive particles as in the pitting step. The roughening shifts some of the metal to form peaks on the contact surface and lips to overlay a part of the pits. This movement is particularly noticeable about the edges of the original pits. As a result, the original pits are partially covered, embedding the dry lubricant for improved retention. When the contact surface is brought into sliding engagement with another surface, the "peaks" of metal are rapidly worn away to provide a contact surface which beds or journals accurately against the other contact surface while allowing the dry lubricant to be progressively wicked to such interface. The exposed metal available for bearing contact comprises at least 35% of the original contact surface.

The following example illustrates the invention. The internal cylindrical surfaces of a set of cylindrical liners for an internal combustion engine were shot-blasted using glass shot having an average particle size in the range of 250–400 microns. The shot was propelled with air pressure of 40–80 psi. Microscopic inspection of the blasted surface revealed that the surface was generally uniformly pitted.

Using a cylindrical buffing wheel, the inner cylindrical surfaces were buffed with $MoS_2$ dry powder, the powder being supplied to the cylindrical surfaces until they appeared to be uniformly coated with $MoS_2$.

The impregnated surfaces were then shot-blasted with glass shot having an average particle size of 250–400 microns using a technique similar to that used to produce pitting. The cylinder liners were then installed in an engine and subjected to a conventional break-in or bedding process. The cylinder liners showed an improved wear property.

I claim:

1. A method of treating a metal contact surface for sliding engagement with another surface which comprises:
   (a) pitting said surface by shot blasting;
   (b) impregnating the pitted surface with a dry lubricant consisting of $MoS_2$; and
   (c) roughening the impregnated surface by shot blasting with glass shot having an average particle size of 250–400 microns in a manner to move some of the metal of the contact surface to form peaks for overhanging and partially closing at least some of said pits.

2. A method according to claim 1 wherein the metal contact surface comprises a cylinder liner for an internal combustion engine.

* * * * *